United States Patent
Neal et al.

(10) Patent No.: US 6,347,349 B1
(45) Date of Patent: *Feb. 12, 2002

(54) SYSTEM FOR DETERMINING WHETHER A SUBSEQUENT TRANSACTION MAY BE ALLOWED OR MUST BE ALLOWED OR MUST NOT BE ALLOWED TO BYPASS A PRECEDING TRANSACTION

(75) Inventors: Danny Marvin Neal, Round Rock; Steven Mark Thurber, Austin, both of TX (US)

(73) Assignee: International Business Machines Corp., Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/221,936

(22) Filed: Dec. 28, 1998

(51) Int. Cl.[7] .............................................. G06F 13/14
(52) U.S. Cl. ........................ 710/62; 710/100; 710/112; 710/128; 711/117
(58) Field of Search ........................ 710/62, 100, 128, 710/112; 711/117

(56) References Cited

U.S. PATENT DOCUMENTS

| | | | |
|---|---|---|---|
| 5,521,910 A | 5/1996 | Matthews | 370/54 |
| 5,610,745 A | 3/1997 | Bennett | 359/139 |
| 5,664,223 A | 9/1997 | Bender et al. | 395/842 |
| 5,694,556 A | 12/1997 | Neal et al. | 395/308 |
| 5,905,876 A | * 5/1999 | Pawlowski et al. | 711/117 |
| 6,108,741 A | * 8/2000 | MacLaren et al. | 710/128 |
| 6,138,192 A | * 10/2000 | Hausauer | 395/292 |

FOREIGN PATENT DOCUMENTS

| | | |
|---|---|---|
| EP | 713307 A2 | 5/1996 |
| EP | 817076 A1 | 1/1998 |

* cited by examiner

*Primary Examiner*—Thomas Lee
*Assistant Examiner*—Abdelmoniem Elamin
(74) *Attorney, Agent, or Firm*—Barry S. Newberger; Winstead Sechrest & Minick P.C.; Leslie Van Leeuwen

(57) ABSTRACT

An apparatus and method for mediating a sequence of transactions across a fabric in a data processing system are implemented. A fabric bridge orders a preceding transaction and a subsequent transaction according to a predetermined protocol. Using the protocol a determination is made whether the subsequent transaction may be allowed to bypass the previous transaction, must be allowed to bypass the previous transaction, or must not be allowed to bypass the preceding transaction. Transactions include load/store (L/S) system memory and L/S to input/output (I/O) device, and direct memory access (DMA) to system memory and DMA peer-to-peer transactions.

30 Claims, 17 Drawing Sheets

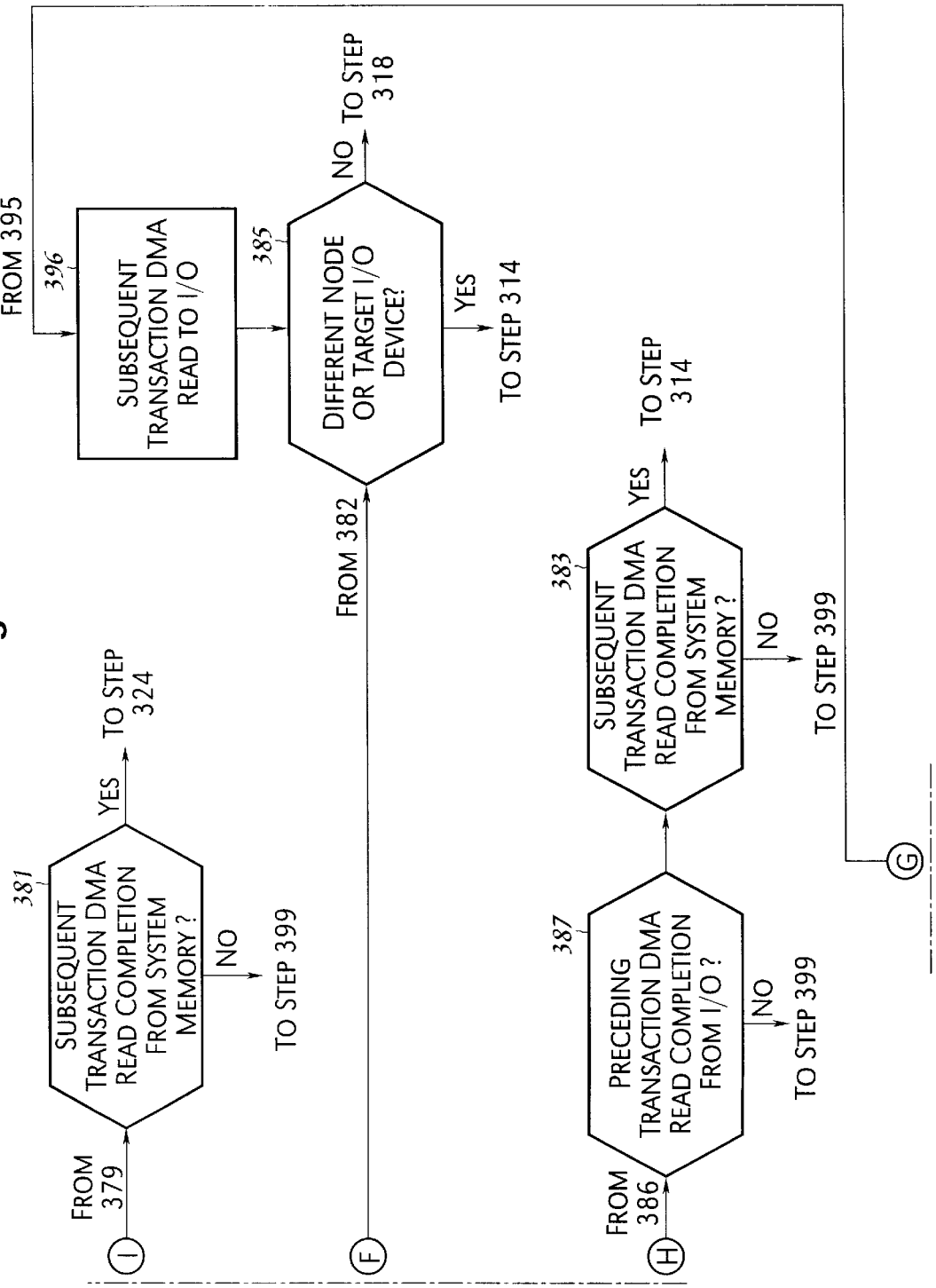

Fig. 4A

| SUBSEQUENT TRANSACTIONS | DMA OPERATIONS TO SYSTEM MEMORY | | | LOAD/STORE OPS | | |
|---|---|---|---|---|---|---|
| | DMA WRITE REQUEST TO SYSTEM MEMORY | DMA READ REQUEST TO SYSTEM MEMORY | DMA READ COMPLETION FROM SYSTEM MEMORY | STORE REQUEST TO I/O | LOAD REQUEST TO I/O | LOAD READ COMPLETION TO I/O |
| DMA OPERATIONS — DMA WRITE REQUEST TO SYSTEM | N | N | A | ⨯A⨯ | A | A |
| DMA READ REQUEST TO SYSTEM MEMORY | N | A | A | ⨯A⨯ | A / 1 | A / 1 |
| DMA READ COMPLETION FROM SYSTEM MEMORY | A | A | A | Y | Y / 2 | A / 2 |

| FIG 4A | FIG 4B |
|---|---|
| FIG 4C | FIG 4D |
| FIG 4E | FIG 4F |

Fig. 4B

| | PRECEEDING TRANSACTIONS | | | | | | |
|---|---|---|---|---|---|---|---|
| | LOAD/STORE OPS | | | | DMA OPERATIONS | | |
| | TO SYSTEM MEMORY | | | | TO I/O PEER-TO-PEER | | |
| | STORE REQUEST TO SYSTEM MEMORY | LOAD REQUEST TO SYSTEM MEMORY | LOAD READ COMPLETION FROM SYSTEM MEMORY | EIEI SYNC | DMA WRITE REQUEST TO I/O | DMA READ REQUEST TO I/O | DMA READ COMPLETION FROM I/O |
| | A | A | A | A | | | |
| | A | A | A | A | | | |
| | A | A | A | Y | Y | Y | |
| | | | | | A | A | A |
| | | | | | Y | Y | A |

Fig. 4C

|  | STORE REQUEST TO I/O | LOAD REQUEST TO I/O | LOAD COMPLETION FROM I/O | STORE REQUEST TO SYSTEM MEMORY | LOAD REQUEST TO SYSTEM MEMORY | LOAD COMPLETION FROM SYSTEM MEMORY | EIEIO SYNC |
|---|---|---|---|---|---|---|---|
| LOAD/STORE OPERATIONS TO I/O — STORE REQUEST TO I/O | A | A | A | A | A | A2 | A2 |
| LOAD REQUEST TO I/O | A | A | A | A | A | A | A |
| LOAD COMPLETION FROM I/O | N3 | A | A | A | A | A | A |
| LOAD/STORE OPERATIONS TO SYSTEM MEMORY — STORE REQUEST TO SYSTEM MEMORY | A | A | A | A | A | A | A |
| LOAD REQUEST TO SYSTEM MEMORY | A | A | A | A | A | A | A |
| LOAD COMPLETION FROM SYSTEM MEMORY | A | A | A | A | A | A | A |
| EIEIO SYNC | A | A | A | A | N | N | N |

Fig. 4D

| A | A | A | A | A | A | A |
|---|---|---|---|---|---|---|
| A | A | A | A | A | A | A |
| A | A | A | A | A 4 | A | A |
| N | N | A | N | A | A | N 11 |
| A | A | A | A | A | A | N |
| A | A | A | A | A | A | N |
| A | A | A | A | A | A | N |

| DMA OPERATIONS TO I/O PEER-TO-PEER | | | | | | | |
|---|---|---|---|---|---|---|---|
| DMA WRITE REQUEST TO I/O | A | Y 5 | Y 5 | Y 5 | Y 5 | Y 5 | Y 5 |
| DMA READ REQUEST TO I/O | A | A | A | A | A | A | A |
| DMA READ COMPLETION FROM I/O | A 7 | A 7 | A 7 | Y 1 | Y 1 | | A |
| DMA WRITE REQUEST TO SYSTEM MEMORY | N | Y 5 | Y 5 | Y 5 | Y 5 | Y 5 | Y 5 |

Fig. 4E

|   |   |   |   |   |   |   |
|---|---|---|---|---|---|---|
| Y 5 | Y 5 | N 6 | Y 5 | Y 5 | Y 5 | Y 5 |
| A | A | N 4 | A | A | A | A |
| A | Y | Y | Y | A 7 | A 7 | A 7 |
| Y 5 | Y 5 | A | Y 5 | Y 5 | Y 5 | Y 5 |

Fig. 4F

NOTES:
1. NOT REQUIRED TO BYPASS IF DIFFERENT DESTINATION NODES.
2. MUST NOT BYPASS IF TO SAME ADDRESS.
3. THE PRECEDING TRANSACTION MUST BE GLOBALLY COHERENT PRIOR TO COMPLETION OF SUBSEQUENT TRANSACTION.
4. MAY BYPASS IF FROM DIFFERENT NODES.
5. A PEER-TO-PEER WRITE REQUEST MUST ALWAYS MAKE PROGRESS IN A PCI EMBODIMENT TO AVOID A DEADLOCK.
6. MAY BYPASS IF FROM DIFFERENT NODES.
7. OPERATIONS TO SYSTEM MEMORY ARE ASSUMED TO BE NON-BLOCKING(ALWAYS MAKE FORWARD PROGRESS) AND ARE NOT REQUIRED TO BE BYPASSED.

SYSTEM FOR DETERMINING WHETHER A SUBSEQUENT TRANSACTION MAY BE ALLOWED OR MUST BE ALLOWED OR MUST NOT BE ALLOWED TO BYPASS A PRECEDING TRANSACTION

CROSS REFERENCE TO RELATED APPLICATION

The present invention is related to the following pending U.S. patent application which is hereby incorporated herein by reference:

Ser. No. 09/221,930 entitled "Apparatus and Method for Fabric Ordering Load/Store and Direct Memory Access Transactions."

TECHNICAL FIELD

The present invention relates in general to data processing systems, and in particular, to transaction ordering in multiple processor node data processing system architectures.

BACKGROUND INFORMATION

Modem data processing systems incorporate a plurality of processing nodes. Each node may itself include one or more central processing units ("CPU"), system memory, which may itself include cache memory, peripheral devices, and a peripheral host bridge ("PHB") coupling a system bus to a peripheral bus.

Additionally, modem data processing systems having multiple processors may implement a shared memory environment. In such environments, a processor, or processors, in one node may access the memory in the other nodes. Typical environments for implementing shared memory across multiple nodes are the non-uniform memory access (NUMA) environment and the cache-only memory access (COMA) environment. Additionally, it is desirable in these systems to implement direct memory access (DMA) by devices in each node, to both local memory and remote memory.

The nodes in such a NUMA or COMA system are coupled via a device, referred to as a "fabric," which mediates the transactions therebetween. Node-node transactions across the fabric, which may include load/store (L/S) operations to I/O devices and DMA peer-to-peer transactions, may give rise to coherency loss, unless the fabric includes a mechanism for transaction ordering. Coherency constraints may be imposed by the architecture of the CPUs in each node, and may also be imposed by the architecture of the buses in each node. Additionally, transaction ordering must be imposed to avoid deadlocks and assuring data in the coherency domain of the system following I/O interrupts. Thus, there is a need in the art for an apparatus and methods for implementing transaction ordering rules across the fabric connecting multiple nodes in a shared memory environment that preserves coherency and avoids transaction deadlocks.

SUMMARY OF THE INVENTION

The aforementioned needs are addressed by the present invention. Accordingly, there is provided, in a first form, a data processing system including a fabric bridge. The fabric bridge is operable for mediating transactions between nodes in the data processing system, the fabric controlling a sequence of transactions between the nodes wherein the fabric bridge determines an ordering of a preceding transaction and a subsequent transaction. The ordering is one of the subsequent transaction may be allowed to bypass, must be allowed to bypass, and must not be allowed to bypass, the preceding transaction, and wherein said sequence of transactions include load/store (L/S) to input/output (I/O) device, and direct memory access (DMA) peer-to-peer transactions.

There is also provided, in a second form, a method of mediating transactions between nodes in a data processing system. The method includes the step of controlling a sequence of transactions between the nodes by determining an ordering of a preceding transaction and a subsequent transaction, the ordering is one of the subsequent transaction may be allowed to bypass, must be allowed to bypass, and must not be allowed to bypass, the preceding transaction, and wherein said sequence of transactions include load/store (L/S) to input/output (I/O) device, and direct memory access (DMA) peer-to-peer transactions.

Additionally, there is provided, in a third form a computer program product operable for storage on program storage media, the program product operable for mediating transactions between nodes in a data processing system. The program product includes programming for controlling a sequence of transactions between the nodes by determining an ordering of a preceding transaction and a subsequent transaction, the ordering being one of the subsequent transaction may be allowed to bypass, must be allowed to bypass, and must not be allowed to bypass, the preceding transaction, and wherein said sequence of transactions include load/store (L/S) to input/output (I/O) device, and direct memory access (DMA) peer-to-peer transactions.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 illustrates, in tabular form, ordering rules implemented by the methodology in FIG. 3.

DETAILED DESCRIPTION

Figure 1:
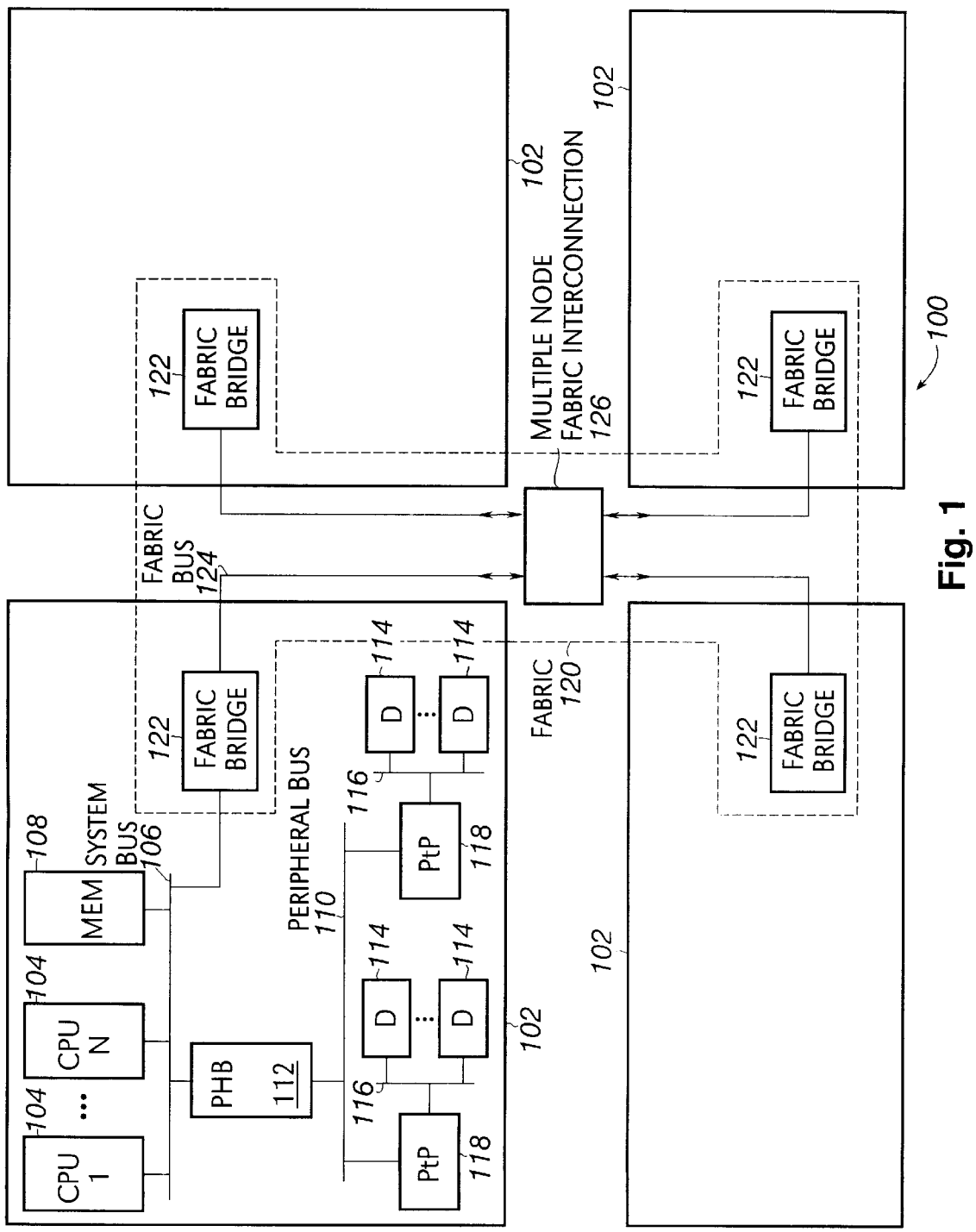
FIG. 1 illustrates a shared memory data processing system in accordance with an embodiment of the present invention.

The present invention provides a mechanism for ordering L/S to I/O and DMA peer-to-peer transactions and L/S to system memory and DMA to system memory through a fabric coupling multiple nodes in a shared resource data processing system environment. L/S and DMA transactions across the fabric are controlled by a state machine which orders the transactions. The state machine determines whether a subsequent transaction may bypass a preceding transaction in accordance with a predetermined rule set. Transaction ordering in a bus bridge has been disclosed in commonly assigned U.S. Pat. No. 5,694,556 to Neal, et al, and which is hereby incorporated herein by reference. The present invention provides a transaction ordering mechanism in a NUMA or COMA environment.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Refer now to FIG. 1 illustrating a multi-node data processing system 100 in accordance with the principles of the present invention. Each node 102 includes a plurality, N, of CPUs 104 coupled to a system bus 106. A portion of system memory, memory 108 is also included in each node, and is coupled to system bus 106.

Peripheral devices reside on a peripheral bus 110, and are interfaced to the system bus via a peripheral host bridge (PHB) 112. Additionally, the peripheral devices, such as devices 114 may themselves reside on one or more sub-buses 116 which are coupled to peripheral bus 110 via peripheral-to-peripheral (denoted PtP on FIG. 1) bridges 118. Such an implementation may be employed in order to meet fanout bus specifications with respect to peripheral bus 110. For example, peripheral bus 110 may, in the embodiment of the present invention, be a peripheral component interconnect (PCI) bus wherein each bus of this type supports ten loads on the bus. It would be understood, however, by an artisan of ordinary skill that the present invention may be provided in other embodiments of shared memory data processing systems, and is not restricted to systems in which peripheral bus 110 is a PCI bus.

Nodes 102 are coupled via fabric 120. Fabric 120 includes fabric bridges 122 and multiple node fabric interconnection 126. Devices within first node 102, such as CPUs 104 or one of peripheral devices 114 may engage in transactions with another device, or memory, in another of nodes 102. These transactions are mediated by fabric bridge 122. Fabric bridge 122 and multiple node fabric interconnection 126, for example, may be in an embodiment of the present invention a scalable coherent interface (SCI), or, alternatively, an electronic switching fabric. In an embodiment of the present invention, fabric bridge 122 may mediate load/store to I/O transactions. Additionally, transactions may include DMA peer-to-peer transactions. Although system 100 in FIG. 1 has been illustrated as having four nodes 102, it would be understood by an artisan of ordinary skill that a multi-node data processing system 100, in accordance with the principles of the present invention, may include any predetermined number of nodes 102, and such an embodiment would be within the spirit and scope of the present invention.

Figure 2A:
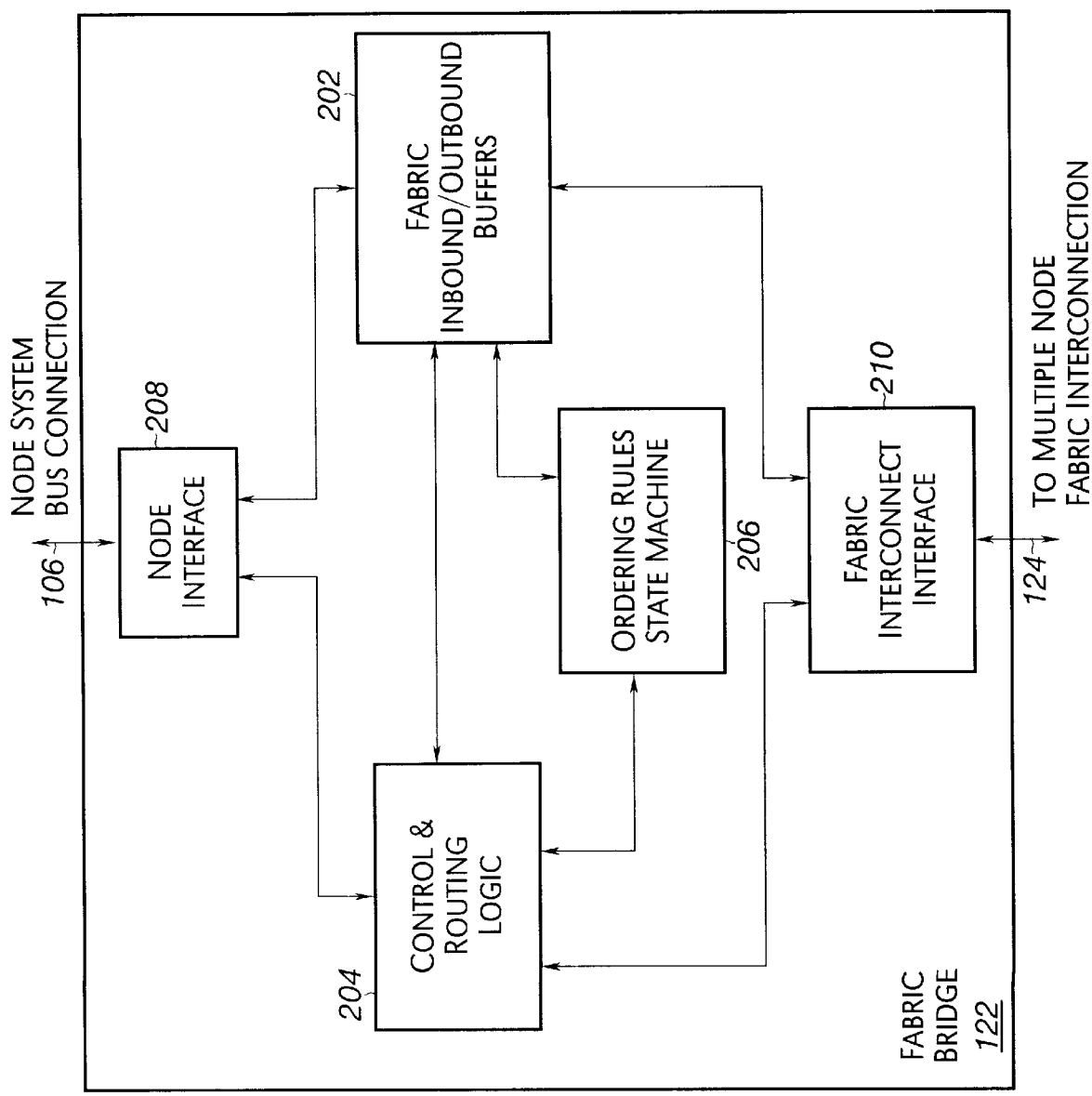
FIG. 2A illustrates, in block diagram form, a fabric bridge in accordance with an embodiment of the present invention.
Figure 2B:
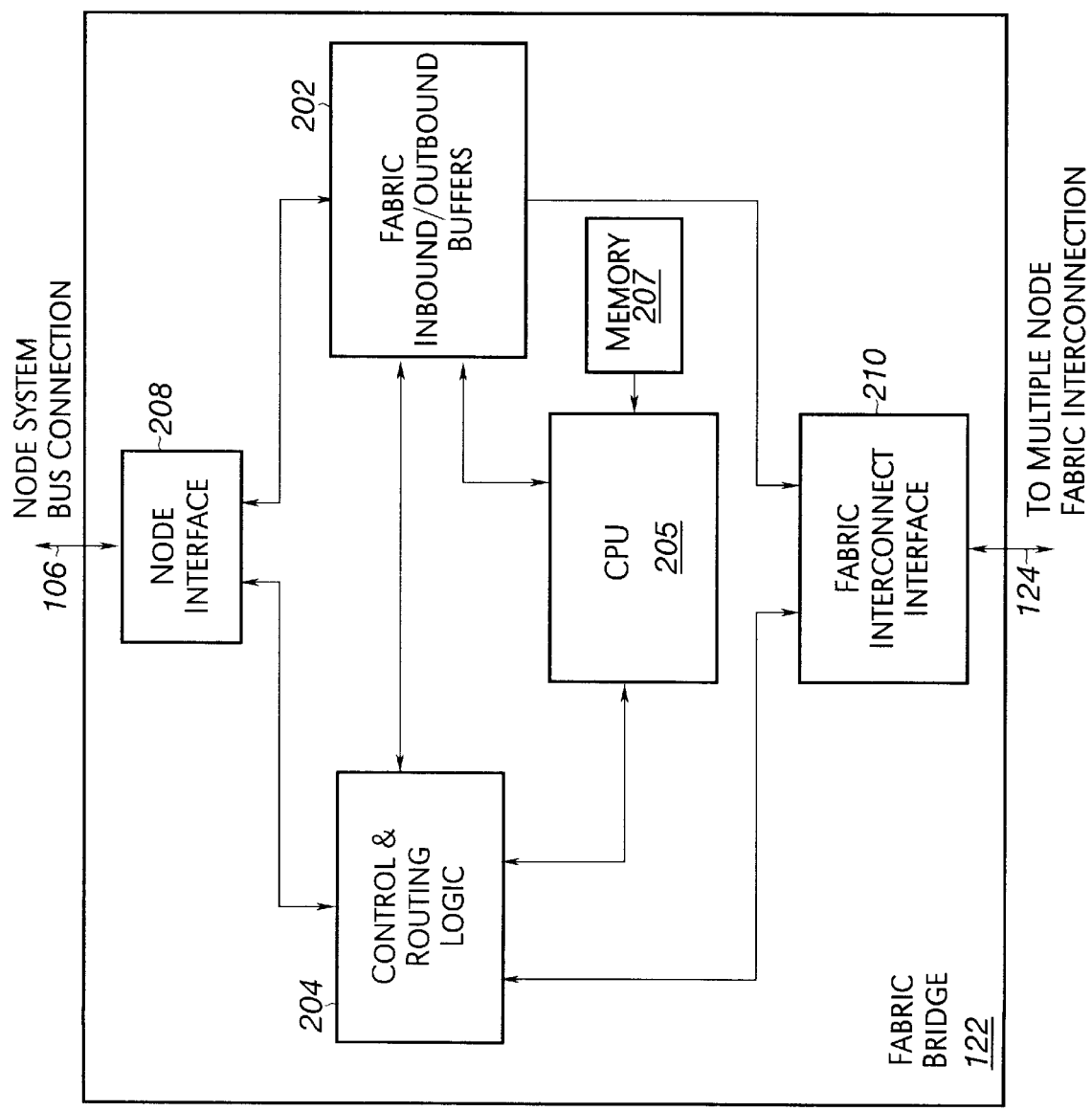
FIG. 2B illustrates, in block diagram form, a fabric bridge in accordance with an alternative embodiment of the present invention.
Figure 3A:
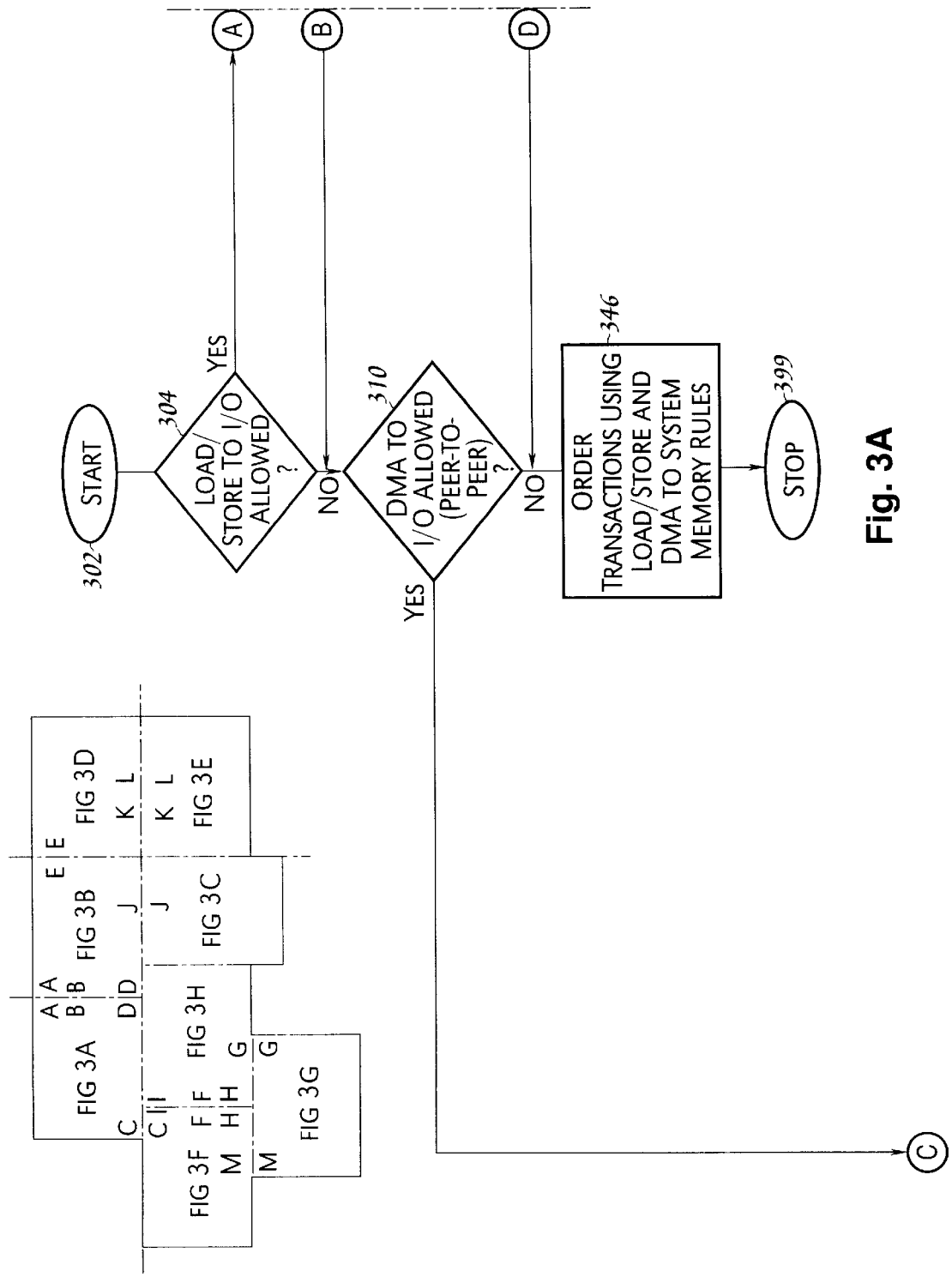
FIG. 3 illustrates, in flowchart form, a method of transaction ordering in accordance with an embodiment of the present invention.
Figure 3B:
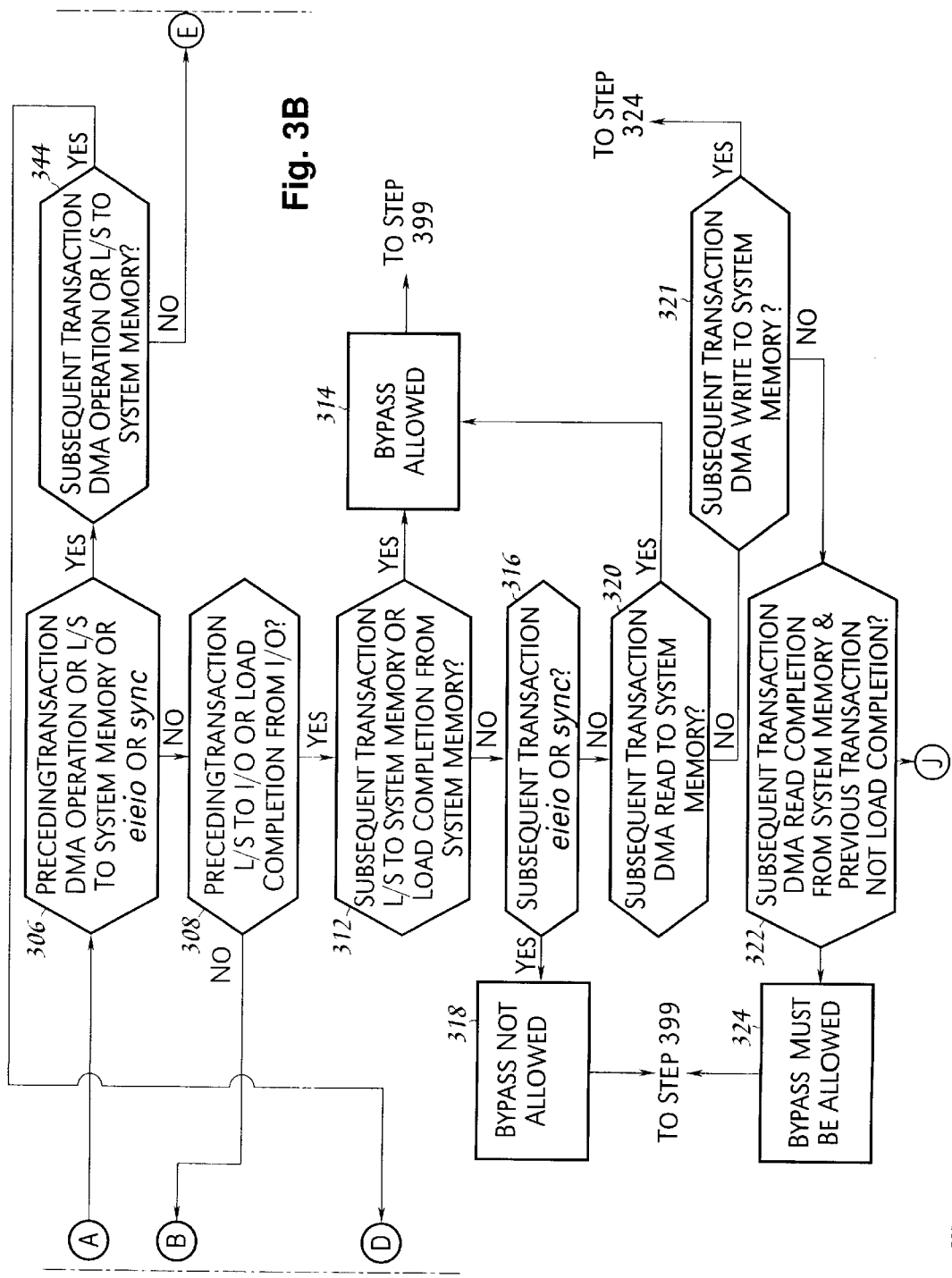
Figure 3C:
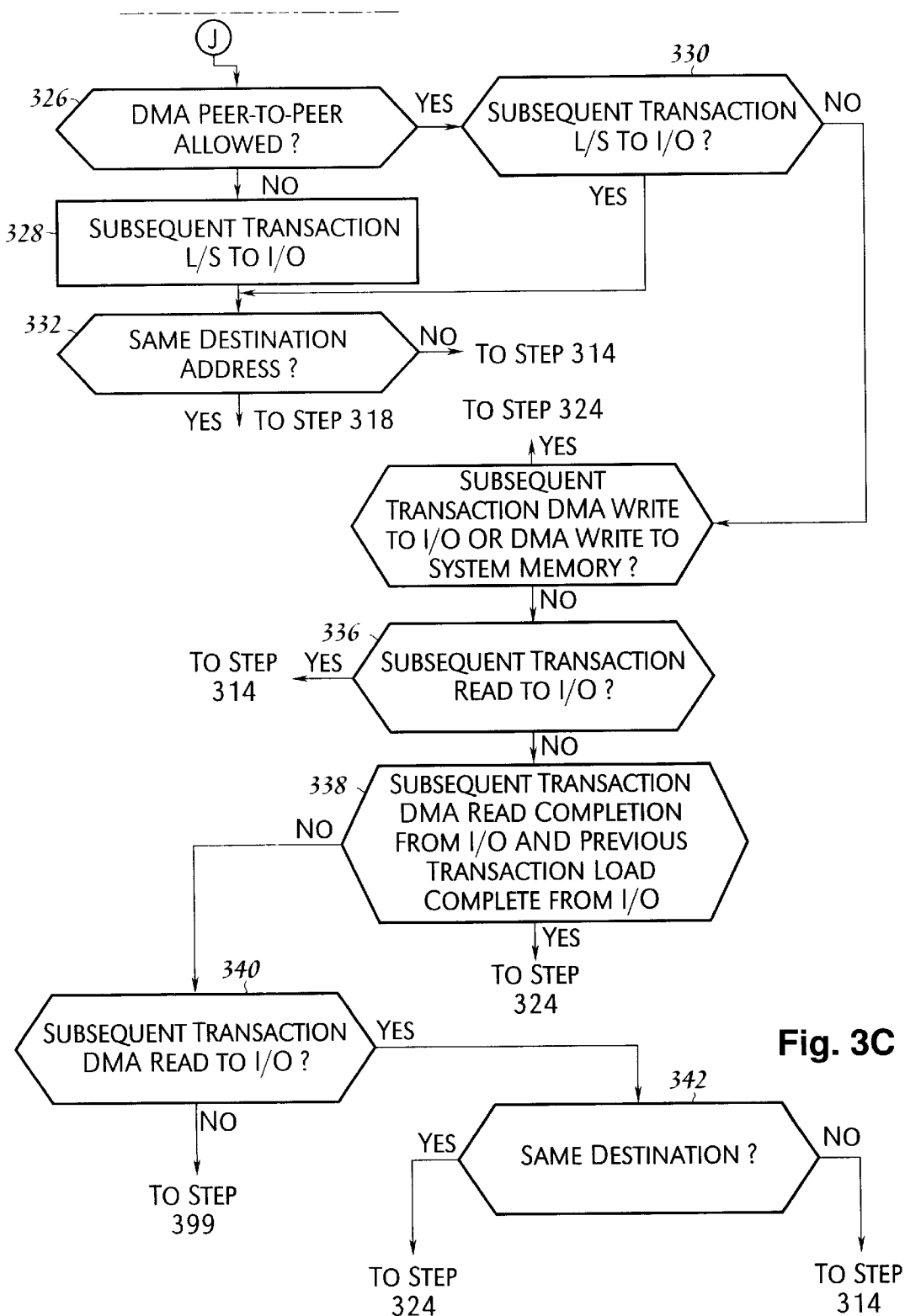
Figure 3D:
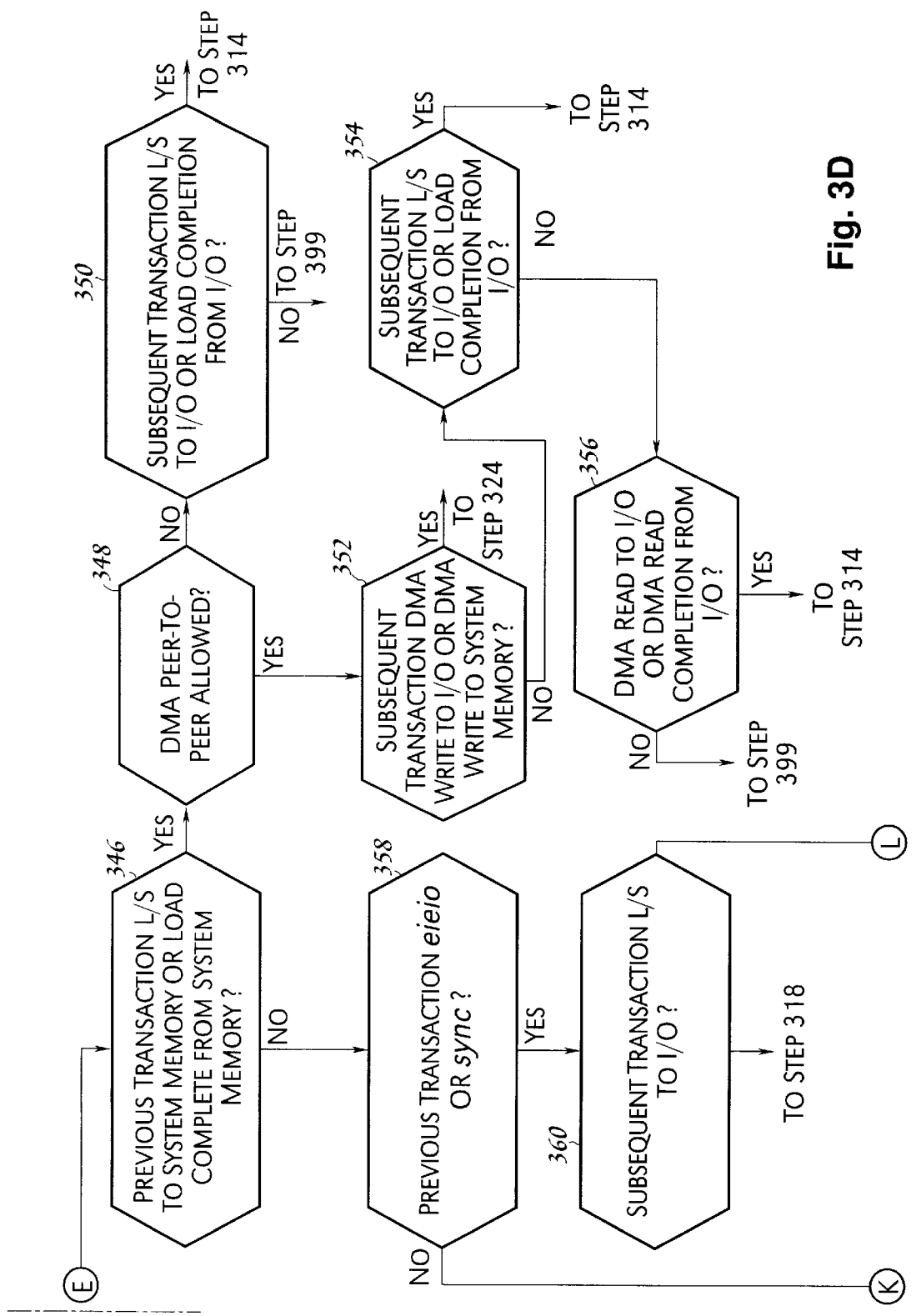
Figure 3E:
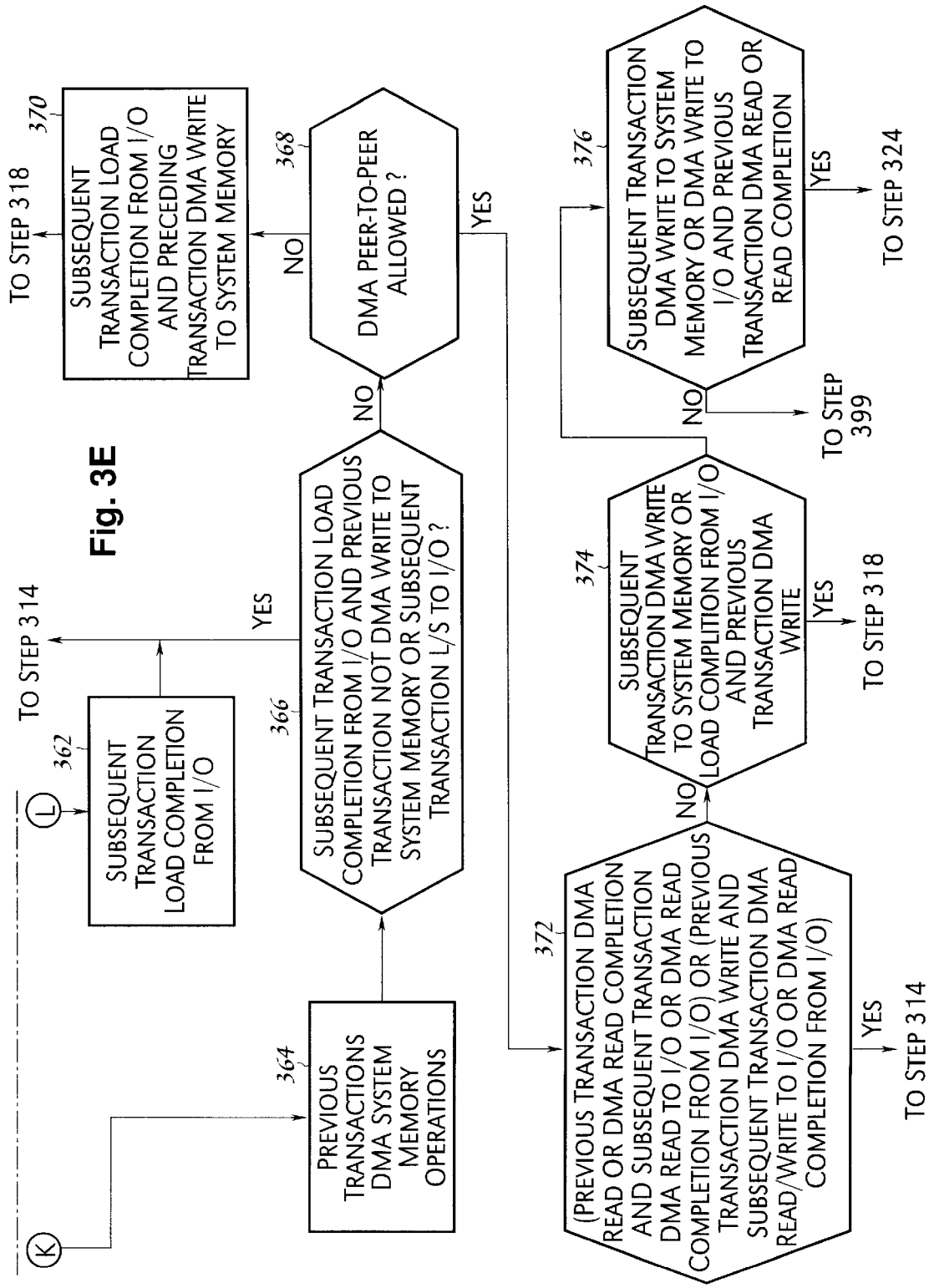
Figure 3F:
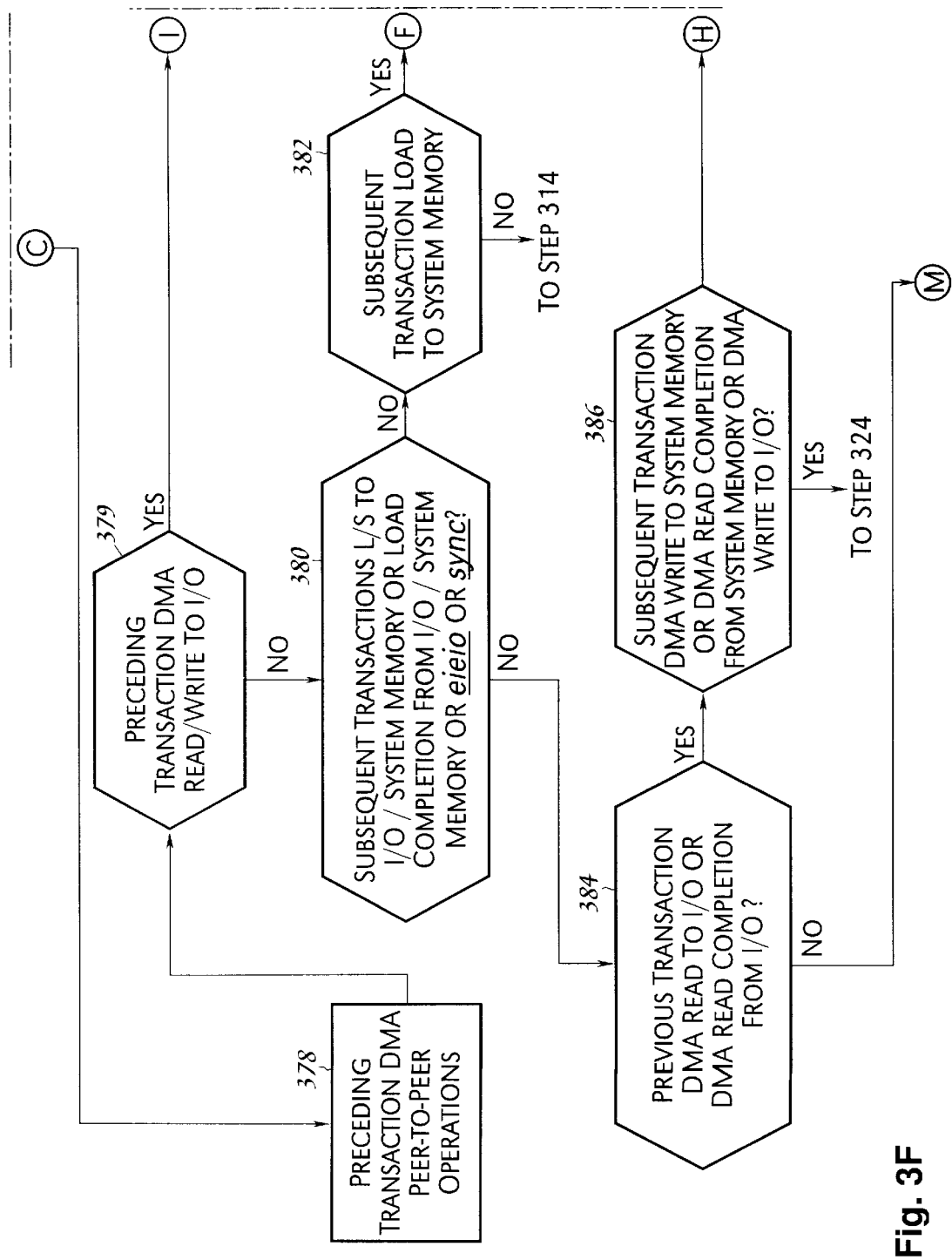
Figure 3G:
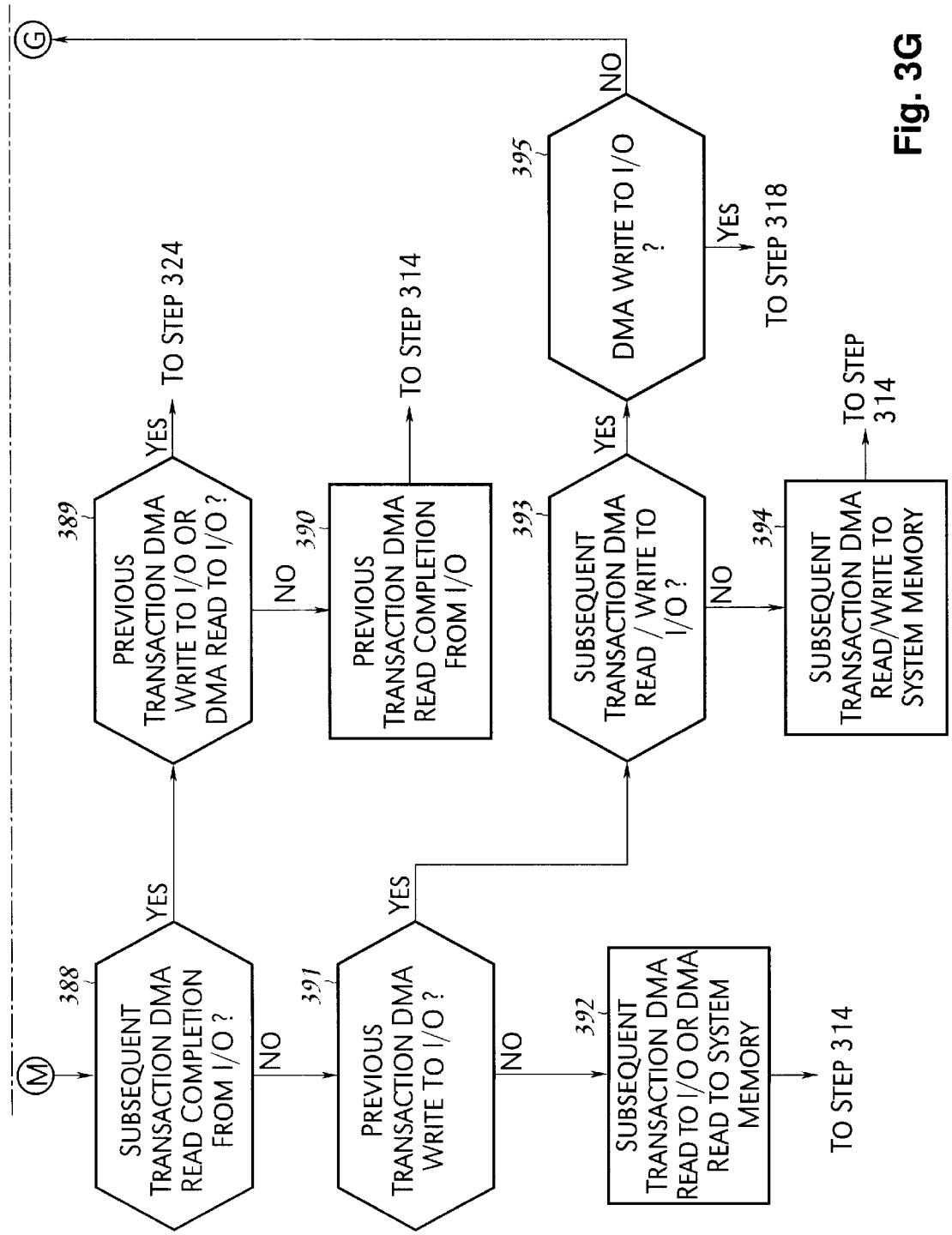

Refer now to FIG. 2 illustrating fabric bridge 122 in further detail. Bridges 122 are coupled to each node via a multiple node fabric interconnection 126, which communicates data and control signals between the node and the bridge. The control signals inform the interconnection of the transaction to be performed. Data to be transferred in a transaction may be posted in buffers 202. For example, for a delayed read request to system memory in a DMA operation, the requesting device 114 in a first node 102 may attempt a read request that is targeted to a memory 108 that is physically located in a second node 102, which is then buffered in fabric bridge 122. Then fabric bridge 122 forwards the request to memory 108 in the second node 102. The data received from memory 108 in the second, destination, node 102 may then be stored in buffer 202, and forwarded to the requesting PHB 112 and then provided to the requesting device 114 when the requesting device 114 re-attempts its request.

Transaction requests executed on the system bus 106 by the PHB 112 that are destined for another node 102 are then accepted by the fabric bridge 122 in the requesting node 102. These transactions are then buffered in buffer 202 and are received by control and routing logic 204 and state machine 206 performs the operations for controlling the particular internode transaction. In an alternative embodiment of fabric bridge 122 illustrated in FIG. 2B, CPU 205 performs as the ordering rules state machine, in accordance with a program of instructions stored in memory 207. Transactions to or from a system at a node 102 exit or enter the fabric bridge at node interface 208. Similarly, transactions to or from other nodes 102 exit or enter the fabric bridge at fabric connect interface 210.

Transactions between nodes 102 are continually being communicated across fabric 120 in FIG. 1. In order that data coherency be preserved and appropriate ordering constraints which may be imposed both by the architecture of CPUs 104 and peripheral bus 110 be observed, state machine 206 or, alternatively, CPU 205 under the control of instructions in memory 207, must implement transaction ordering rules, whereby the execution of a subsequent transaction is constrained by a preceding transaction. In other words, state machine 206 or, alternatively, CPU 205 determines, from a set of ordering rules, when a subsequent transaction either may be allowed to be performed ahead of a preceding transaction if it has become temporarily stalled, must be allowed to execute ahead of a preceding transaction, or must be executed in order, that is, must not be allowed to execute ahead of a preceding transaction. State machine 206 or CPU 205 determines orderings in accordance with the methodology 300 illustrated in flowchart form, in FIG. 3.

Referring now to FIG. 3 illustrating, in flow chart form, a methodology 300 for ordering transactions in fabric 122, FIG. 1, supporting L/S operations to I/O devices, and peer-to-peer DMA transactions and L/S to system memory and DMA to system memory. Additionally, CPUs 104 may implement instructions that impose an ordering on bus transactions. For example, the Power PC architecture ("Power PC" is a trademark of IBM Corporation) implements sync and eieio (enforce in-order execution of I/O) instructions. Execution of the sync instruction ensures that all Load and Store instructions prior to the sync instruction are completed on the bus before program execution proceeds past the sync instruction. The eieio instruction execution causes all Load and Store instructions prior to the execution of the eieio instruction to be marked for performance on the bus before any writes that may be posted subsequent to the execution of the eieio instruction. Methodology 300 starts, in step 302, and, and in step 304 determines if L/S to I/O transactions are allowed. If, in step 304, L/S to I/O are allowed, then in step 306, it is determined if a preceding transaction is a DMA operation or an L/S to system memory or an eieio or sync transaction. If not, methodology 300 then determines, in step 308 if the preceding transaction is a L/S to I/O or a load completion from I/O. If not, methodology 300 continues in step 310 to determine if DMA peer-to-peer transactions are allowed.

If, however in step 308 the preceding transaction is a L/S to I/O or a load completion from I/O, it is determined in step 312 if the subsequent transaction is a L/S to system memory or a load completion from system memory. If so, then in step 314 the subsequent transaction is allowed to bypass the preceding transaction, and methodology 300 terminates in step 399. If, however in step 312 the subsequent transaction is not an L/S to system memory or a load completion from system memory, then in step 316 it is determined if the subsequent transaction is an eieio or sync transaction. If, in step 316 the subsequent transaction is an eieio or sync, then in step 318 methodology 300 determines that the subsequent transaction is not allowed to bypass the previous L/S to I/O or load completion from I/O. If, however in step 316 the subsequent transaction is not an eieio or sync transaction, then methodology 300 determines in step 320 if the subsequent transaction is a DMA read to system memory. If so, then it is determined in step 314 that the subsequent transaction may bypass the preceding transaction. Otherwise, it is determined, in step 321, if the subsequent transaction is a DMA write to system memory. If so, in step 324 the transaction must be allowed to bypass. Otherwise, it is determined in step 322 if the subsequent transaction is a DMA read completion from system memory and the preceding transaction is not a load completion. If so, in step 324 it is determined that bypass must be allowed. If, in step 322 the subsequent transaction is not a DMA read completion or the preceding transaction is not a load completion then, in step 326 it is determined if peer-to-peer traffic is allowed. If not, in step 328 it is recognized that the subsequent transaction is either a load or store to I/O. Otherwise, in step 326, if peer-to-peer transactions are allowed, it is determined if the subsequent transaction is a load or store to I/O. If so, or, if in step 326 it was determined that peer-to-peer transactions were not allowed and that therefore the subsequent transaction necessarily was either a load or store to I/O, in step 332 it is determined if the previous L/S to I/O or load completion from I/O and the subsequent L/S to I/O are to the same destination address. If so, it is determined in step 318 that bypass is not allowed. However, if the destination address is not the same in step 332, it is determined in step 314 that bypass may be allowed.

If, in step 326 peer-to-peer is allowed, and in step 330, the subsequent transaction is not a L/S to I/O then, in step 334 it is determined if the subsequent transaction is a DMA write to I/O or a DMA write to system memory. If so, it is determined, in step 324 that bypass must be allowed. If, however, in step 334 the subsequent transaction is not a DMA write to I/O or a DMA write to system memory, it is determined, in step 336 if the subsequent transaction is a read request to I/O. If so, the subsequent read request to I/O may bypass the previous L/S to I/O or load completion from I/O, step 314. If however, the subsequent transaction is not a read to I/O, methodology 300 determines, in step 338 if the subsequent transaction is a DMA read complection from I/O and the preceding transaction, in step 308 is a load completion from I/O. If not, it is determined in step 340 if the subsequent transaction is a DMA read to I/O. If, however in step 338, the subsequent transaction is a DMA read completion from I/O in the preceding transaction, step 308, is a load completion from I/O then, in step 314, bypass may be allowed. If, in step 340 it is determined that the subsequent transaction is a DMA read to I/O and in step 342 that the transactions are to the same destination, then bypass of the previous load completion from I/O by the subsequent read completion from I/O must be allowed, step 324. Otherwise, in step 314 the transaction is allowed to bypass.

Returning to step 306, if it is determined that the preceding transaction is a DMA operation or a L/S to system memory or an eieio or a sync then, it is determined, in step 344 if the subsequent transaction is a DMA operation or a load or store to system memory. If the subsequent transaction is a DMA operation or a L/S to system memory then, methodology 300, in step 346, orders the transactions in accordance with the methodology for ordering L/S and DMA to system memory transactions described in the co-pending, commonly assigned U.S. Patent Application entitled, "Apparatus and Method for Fabric Ordering of Load/Store and Direct Memory Access Transactions," incorporated herein by reference. If, however in step 344, subsequent transactions are not DMA operations or L/S operations to system memory then, it is determined, in step 346 if the preceding transaction, from step 306 is a L/S to system memory to load complete from system memory. If so, it is determined in step 348 if peer-to-peer transactions are allowed. If not, then methodology 300 determines, in step 350 if the subsequent transaction is either a load or store to I/O or a load completion from I/O and, if so, in step 314 it is determined that bypass of the preceding transaction by the subsequent L/S or load completion may be allowed. If not, methodology 300 returns to step 399.

Otherwise, if in step 348 peer-to-peer transactions are allowed, it is determined in step 352 if the subsequent transaction is a DMA write to I/O or a DMA write to system memory. If so, in step 324 the subsequent DMA write to I/O or system memory must be allowed to bypass the previous L/S to system memory or load complete from system memory, from step 346.

If, however in step 352 the subsequent transaction is not a DMA write to I/O or system memory then, in step 354 it is determined if the subsequent transaction is a L/S to I/O or a load completion from I/O. If so, then the subsequent transaction may be allowed to bypass the previous L/S to system memory or load complete from system memory in step 346, step 314. If, however, in step 354, the subsequent transaction is not a L/S to I/O or load completion from I/O, then, in step 356 it is determined if the subsequent transaction is a DMA read to I/O or a DMA read completion from I/O and, if so, the subsequent DMA read, in step 356 may be allowed to bypass, in step 314, the previous L/S to system memory or load completion from system memory determined in step 346. Otherwise, methodology 300 goes to step 399.

Returning to step 346, if it is determined that the preceding transaction is not a L/S to system memory or a load complete from system memory, in step 358 it is determined if the preceding transaction is an eieio or sync. If so, in step 360 it is determined if the subsequent transaction is a load or store to I/O. If so, the subsequent load or store to I/O, in step 318 is not allowed to bypass the previous eieio or sync. Otherwise, methodology 300 recognizes, in step 362 that the subsequent transaction is a load completion from I/O and, in step 314 bypass of the previous eieio or sync, from step 358, may be allowed to be bypassed by the subsequent load completion from I/O from step 362.

Returning to step 358, if the preceding transaction is not an eieio or sync, then, in step 364, methodology 300 recognizes that the preceding transaction is a DMA system memory operation, and in step 366 it is determined if the subsequent transaction is a load completion from I/O and the preceding transaction is not a DMA write to system memory or if the subsequent transaction is a L/S to I/O. If so, then the subsequent transaction may be allowed, in step 314, to bypass the previous DMA system memory operation. Otherwise, in step 368 it is determined if DMA peer-to-peer transactions are allowed. If not, in step 370, it is recognized by methodology 300, that the subsequent transaction is a load completion from I/O and the preceding transaction a DMA write to system memory, and the subsequent load completion from I/O, is not allowed to bypass the previous DMA write to system memory. The subsequent load completion from I/O is not allowed to bypass the previous DMA write because the preceding DMA write to system memory must be globally coherent prior to the completion of the subsequent transaction, that is the load completion from I/O.

If, however, in step 368 DMA peer-to-peer transactions are allowed, then it is determined in step 372 if the preceding transaction is a DMA read to system memory or a DMA read completion from system memory and the subsequent transaction is either a DMA read to I/O or a DMA read completion from I/O or the preceding transaction is a DMA write to system memory and the subsequent transaction is either a DMA read or write to I/O or a DMA read completion from I/O. If the previous and subsequent transactions satisfy one of these sets of conditions, then in step 314, the subsequent transaction may be allowed to bypass the preceding transaction. If, in step 372, the previous and subsequent transactions are determined not to satisfy one of these sets of conditions, then, in step 374 methodology 300 determines if the subsequent transaction is a DMA write to system memory or a load completion from I/O, and the preceding transaction was a DMA write to system memory.

If the subsequent and preceding transactions satisfy this condition, then, in step 318, the subsequent transaction, either a DMA write to system memory or the load completion from I/O is not allowed to bypass the previous DMA write to system memory. Otherwise, in step 376, methodology 300 determines if the subsequent transaction is either a DMA write to system memory or a DMA write to I/O and the DMA in the preceding transaction is either a DMA read request to system memory or a DMA read completion from system memory. If so, it is determined, in step 324 that the subsequent transaction either a DMA write to system memory or a DMA write to I/O must be allowed to bypass the previous DMA read request or read completion. Otherwise, methodology 300 goes to step 399.

Returning again to step 306, if the preceding transaction is neither a DMA operation or a L/S to system memory or an eieio or sync, it is then determined in step 308 if the preceding transaction is a L/S to I/O or a load completion from I/O. The "Yes" path from step 308 has been described herein above. If, in step 308 it is determined if the preceding transaction is not an L/S to I/O or a load completion from I/O, then methodology 300 returns to step 310 and determines if DMA peer-to-peer transactions are allowed. If not, then methodology 300 orders the transactions using the L/S and DMA to system memory ordering protocol described in commonly owned, co-pending U.S. entitled "Apparatus and Method for Fabric Ordering for Load/Store and Direct Memory Access Transactions," incorporated herein by reference.

If, however in step 310 DMA peer-to-peer transactions are allowed, methodology 300 recognizes, in step 378 that the preceding transaction is a DMA peer-to-peer operation, in that all other possibilities have been previously considered.

It is determined in step 379 if the preceding transaction was a DMA read or write to I/O. If so, it is determined in step 381 if the subsequent transaction is a DMA read completion from system memory. If so, in step 324 the subsequent transaction must be allowed to bypass. Otherwise methodology goes to step 399. If in step 379, the no path is taken, the methodology proceeds to step 380. It is then determined in step 380 if the subsequent transaction is a L/S to I/O or system memory or a load completion from I/O or system memory or an eieio or a sync transaction. If so, in step 382 it is further determined if the subsequent transaction is a load to system memory, if not, in step 314 bypass of the preceding transaction by the subsequent transaction, one of a load or store to I/O or a store to system memory or a load completion from I/O or system memory or an eieio or sync, from step 380. If, however, the subsequent transaction is a load to system memory, then it is further determined, in step 385 if the previous and subsequent transactions are to a different node or target R/O device. If so, in step 314 the subsequent load to system memory, in step 382, may be allowed to bypass the preceding transaction. Otherwise, if in step 385, the subsequent load to system memory is to the same node as the preceding transaction, then in step 318, the subsequent load to system memory is not allowed to bypass the pervious transaction because the preceding transaction must be complete prior to the subsequent transaction.

Returning to step 380, if the subsequent transaction is not a L/S to I/O or system memory, or a load completion from I/O or system memory, or an eieio or sync, then in step 384 it is determined if the preceding transaction is a DMA read to I/O or a DMA read completion from I/O. If so, in step 386 it is determined if the subsequent transaction is a DMA write to system memory, or a DMA write to I/O. If so, then in step 324 it is determined that the subsequent transaction must be allowed to bypass the previous DMA read to I/O or DMA read completion from I/O. If in step 386, it is determined that the subsequent transaction is not a DMA write to system memory, a DMA read completion from system memory or a DMA write to I/O, in step 387, it is determined if the preceding transaction is a DMA read completion from I/O. If not, methodology 300 proceeds to step 399. Otherwise, in step 383, it is determined if the subsequent transaction is a DMA read completion from system memory. If so, the preceding transaction may be bypassed, step 314. Otherwise methodology 300 terminates in step 399.

If, in step 384 the preceding transaction is not a DMA read to I/O or a DMA read completion from I/O, in step 388 it is determined if the subsequent transaction is a DMA read completion from I/O. If so, in step 389, methodology 300 determines if the preceding transaction is a DMA write to I/O or a DMA read to I/O. If so, in step 324, it is determined that the subsequent DMA read completion from I/O, step 389, must be allowed to bypass the previous DMA transactions in step 389. If, however in step 389 the preceding transaction was not a DMA write to I/O or DMA read to I/O, methodology 300 recognizes that the preceding transaction is a DMA read completion from I/O, in step 390, and, in step 314, it is determined that the subsequent DMA read completion from I/O, step 388, may be allowed to bypass the pervious DMA read completion from I/O.

If, however in step 388 it is determined that the subsequent transaction is not a DMA read completion from I/O, in step 391, it is determined if the preceding transaction is a DMA write to I/O. If not, in step 392, methodology 300 recognizes that the preceding transaction must have been a DMA read to I/O or a DMA read completion from I/O, arriving at step 392 via step 386, and the subsequent transaction must be a DMA read to I/O or a DMA read to system memory. Then, in step 314, the subsequent DMA read to I/O or DMA read to system memory may be allowed to bypass the previous DMA read to I/O or DMA read completion from I/O.

If, however in step 391 the preceding transaction is a DMA write to I/O, then in step 393 it is determined if the subsequent transaction is a DMA read or write to I/O. If not, then it is recognized that the subsequent transaction is a read or write to system memory, step 394, and, in step 314 the subsequent DMA read or write to system memory may be a allowed to bypass the previous DMA write to I/O.

If, however in step 393 it is determined the subsequent transaction is a read or write to I/O, it is further determined in step 395 if the subsequent transaction is a DMA write to I/O. If so, the subsequent DMA write to I/O is not allowed to bypass the previous DMA write to I/O, step 318. If, however in step 395 the subsequent transaction is not a DMA write to I/O then, in step 396 it is recognized that the subsequent transaction must be a DMA read to I/O. Then, in step 385 it is determined if the subsequent DMA read to I/O in the previous DMA write to I/O, from step 391, are to a different node or target R/O device. If so, then in step 314 the subsequent DMA read may be allowed to bypass the previous DMA write. However, if in step 385, the subsequent DMA read is to the same node or target I/O device as the previous DMA write, then the subsequent DMA read must not bypass the previous DMA write, step 318. Methodology 300 then terminates in step 399.

The ordering protocols implemented by methodology 300 may be summarized as illustrated in the table in FIG. 4. The table in FIG. 4 defines sets of transaction pairs that are ordered as indicated by the corresponding entry in the table where "A" indicates preceding/subsequent transactions in which the subsequent transaction may be allowed to bypass the preceding transaction, "Y" indicates the subsequent transaction must be allowed to bypass the preceding transaction, and "N" indicates the subsequent transaction must not be allowed to bypass the transaction.

The present invention provides a mechanism for a fabric bridge in a multi-node, NUMA/COMA data processing environment. Under control of the state machine included in the fabric bridge, transactions between nodes mediated by the bridge may be ordered in accordance with the methodology executed by the state machine. The bridge orders transactions mediated by the bridge so that coherency requirements are preserved, and deadlocks avoided.

What is claimed is:

1. A data processing system comprising:
   a fabric bridge operable for mediating transactions between nodes in said data processing system, said fabric bridge being operable for controlling a sequence of transactions between said nodes wherein said fabric bridge determines an ordering of a preceding transaction and a subsequent transaction, said ordering being in a set of said subsequent transaction may be allowed to bypass, must be allowed to bypass, and must not be allowed to bypass, said preceding transaction, and wherein said sequence of transactions include load/store (L/S) to input/output (I/O) device, and direct memory access (DMA) peer-to-peer transactions.

2. The data processing system of claim 1 wherein said ordering is said subsequent transaction may be allowed to bypass, said subsequent transaction must be allowed to bypass, and said subsequent transaction must not be allowed to bypass, when said preceding and subsequent transactions are in one of a first, second and third predetermined sets of transaction pairs, respectively.

3. The data processing system of claim 1 wherein said fabric bridge determines said transaction ordering according to a predetermined protocol.

4. The data processing system of claim 2 wherein said first, second and third sets are determined according to a predetermined protocol.

5. The data processing system of claim 1 wherein said fabric bridge further includes:
   control circuitry operable for controlling said sequence of transactions between said nodes, said control circuitry determining an ordering of said preceding transaction and said subsequent transaction.

6. The data processing system of claim 5 wherein said control circuitry includes a state machine, said state machine determining an ordering of said preceding transaction and said subsequent transaction in accordance with a predetermined protocol.

7. The data processing system of claim 5 further including at least one buffer operable for storing transaction information, said buffer communicating transaction information in response to a signal from said control circuitry.

8. The data processing system of claim 1 wherein said sequence of transactions further includes direct memory access (DMA) to system memory and load/store to system memory.

9. The data processing system of claim 8 wherein said sequence of transactions further includes eieio and sync instructions.

10. The data processing system of claim 1 further including a plurality of central processing units (CPU) coupled to said fabric bridge, each CPU being operable for generating one or more transactions of said sequence of transactions.

11. A method of mediating transactions between nodes in a data processing system comprising the steps of:
    controlling a sequence of transactions between said nodes by determining an ordering of a preceding transaction and a subsequent transaction, said ordering being in a set of said subsequent transaction may be allowed to bypass, must be allowed to bypass, and must not be allowed to bypass, said preceding transaction, and wherein said sequence of transactions include load/store (L/S) to input/output (I/O) device, and direct memory access (DMA) peer-to-peer transactions.

12. The method of claim 11 wherein said ordering is said subsequent transaction may be allowed to bypass, said subsequent transaction must be allowed to bypass, and said subsequent transaction must not be allowed to bypass, when said preceding and subsequent transactions are in one of a first, second and third predetermined sets of transaction pairs, respectively.

13. The method of claim 11 wherein said transaction ordering is determined according to a predetermined protocol.

14. The method of claim 12 wherein said first, second and third sets are determined according to a predetermined protocol.

15. The method of claim 11 wherein the step of controlling said sequence of transactions includes providing control circuitry operable for controlling said sequence of transactions between said nodes, said control circuitry determining an ordering of said preceding transaction and said subsequent transaction.

16. The method of claim 15 wherein said control circuitry includes a state machine, said state machine determining an ordering of said preceding transaction and said subsequent transaction in accordance with a predetermined protocol.

17. The method of claim 15 wherein the step of controlling said sequence of transactions further includes:

providing at least one buffer operable for storing transaction information; and communicating transaction information via said buffer in response to a signal from said control circuitry.

18. The method of claim 11 wherein said sequence of transactions further includes direct memory access (DMA) to system memory and load/store to system memory.

19. The method of claim 18 wherein said sequence of transactions further includes eieio and sync instructions.

20. The method of claim 11 wherein said sequence of transaction includes transactions generated by one or more central processing units (CPUs).

21. A computer program product operable for storage on program storage media, the program product operable for mediating transactions between nodes in a data processing system, the program product comprising:

programming for controlling a sequence of transactions between said nodes by determining an ordering of a preceding transaction and a subsequent transaction, said ordering being in a set of said subsequent transaction may be allowed to bypass, must be allowed to bypass, and must not be allowed to bypass, said preceding transaction, and wherein said sequence of transactions include load/store (L/S) to input/output (I/O) device, and direct memory access (DMA) peer-to-peer transactions.

22. The program product of claim 21 wherein said ordering is said subsequent transaction may be allowed to bypass, said subsequent transaction must be allowed to bypass, and said subsequent transaction must not be allowed to bypass, when said preceding and subsequent transactions are in one of a first, second and third predetermined sets of transaction pairs, respectively.

23. The program product of claim 21 wherein said transaction ordering is determined according to a predetermined protocol.

24. The program product of claim 22 wherein said first, second and third sets are determined according to a predetermined protocol.

25. The program product of claim 21 wherein said programming for controlling said sequence of transactions includes programming for control circuitry operable for controlling said sequence of transactions between said nodes, said control circuitry determining an ordering of said preceding transaction and said subsequent transaction in response to said programming.

26. The program product of claim 25 wherein said control circuitry includes a state machine, said state machine determining an ordering of said preceding transaction and said subsequent transaction in accordance with a predetermined protocol in response to said programming.

27. The program product of claim 25 wherein said programming for controlling said sequence of transactions further includes:

programming for controlling at least one buffer operable for storing transaction information; and programming for communicating transaction information via said buffer in response to a signal from said control circuitry.

28. The program product of claim 21 wherein said sequence of transactions further includes direct memory access (DMA) to system memory and load/store to system memory.

29. The program product of claim 28 wherein said sequence of transactions further includes eieio and sync instructions.

30. The program product of claim 21 wherein said sequence of transaction includes transactions generated by one or more central processing units (CPUs).

* * * * *